Patented Dec. 31, 1940

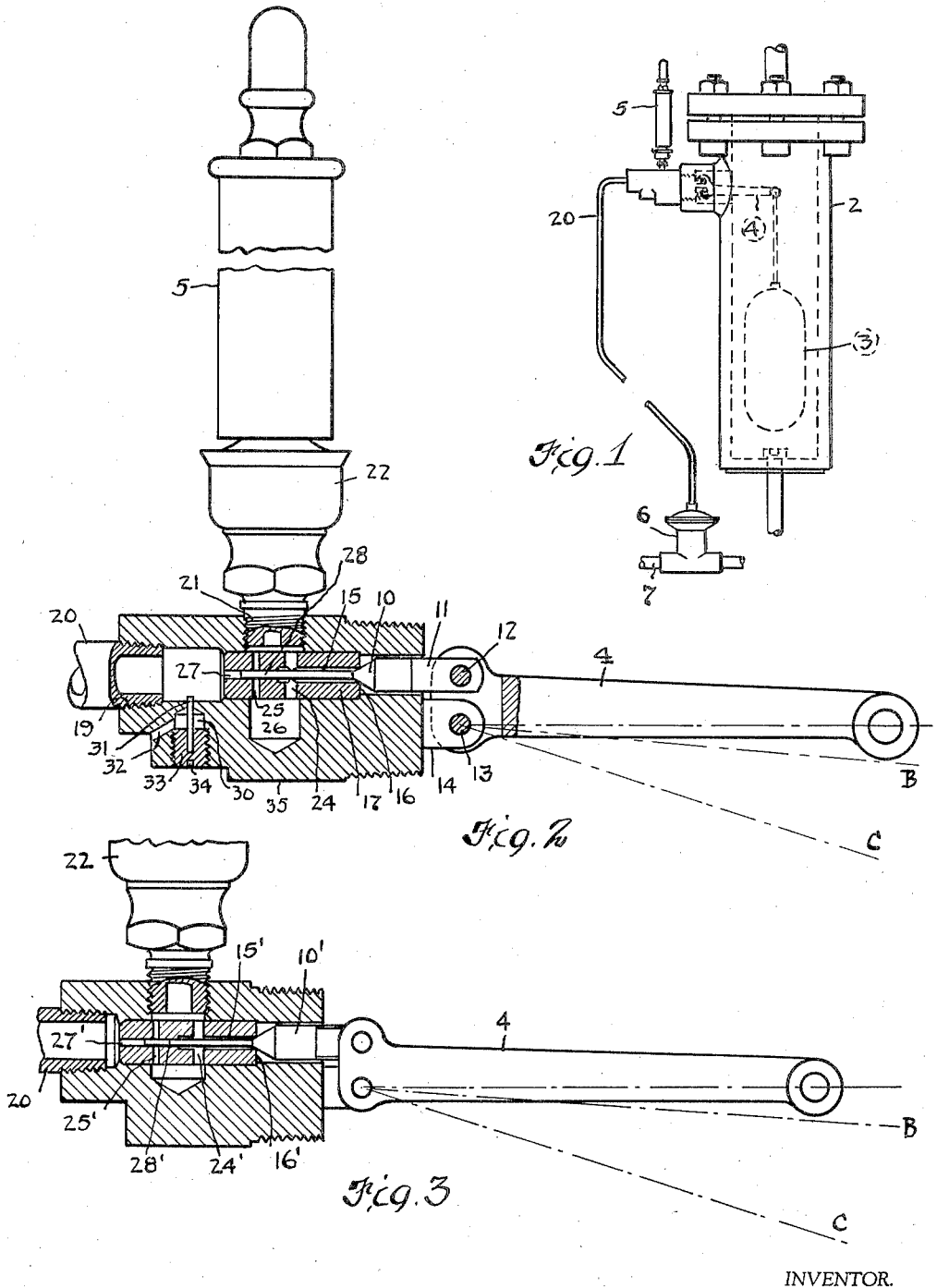

2,227,405

UNITED STATES PATENT OFFICE 2,227,405

PLURAL VALVE CONTROL

John Rowland Brown, Cleveland Heights, Ohio, assignor to The Reliance Gauge Column Company, Cleveland, Ohio, a corporation of Ohio Application September 30, 1938, Serial No. 232,637

7 Claims. (Cl. 137—104)

In multiple valve control apparatus such as in boiler safety equipment, it sometimes occurs that, due to interference by dirt or corrosion, the desired and intended spaced sequence of sounding of a warning and then shutting off the fuel, fails in operation, and the attendant is not given opportunity to make the necessary corrections in a sufficient interval before shut-off of the furnace-fire. There is accordingly an undesirable interruption and delay and much extra work and annoyance in getting the plant back into operation. In accordance with the present invention however, a construction may be had in which a positive and reliable unchangeable sequence of operation in valves is assured and safety is provided without unnecessary shut-down interruption of the plant.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

In said annexed drawing:

Fig. 1 is a side elevational view showing an embodiment of the invention; Fig. 2 is an enlarged sectional detail; and Fig. 3 is a similar detail of a modification.

At a suitable point in relation to the liquid-level of a boiler for instance, control apparatus is provided such as to be responsive to abnormal drop in the water level, and thus for instance in a water column 2 of a steam boiler a liquid-operated element or float 3, through a lever 4 operates a plurality of valves which control a supply of steam to sound an alarm whistle 5 and in sequence then operate a controlling valve 6 on a line 7 which may be the fuel-line to the fire box, or the steam line to a supply-pump, the further details of the boiler set-up and connections being immaterial to the present invention. Operated by the lever 4 as indicated, is a valve 10 whose valve stem 11 is pivotally connected at 12 to the lever 4 which in turn is pivotally connected at 13 to a support bracket 14, such as to constitute in effect a bell crank lever fulcrumed at point 13 and operating the valve 10 to control an axial bore 15, the valve being moved into and out of relation with the valve seat 16. Advantageously, the latter may be on an insert 17, thus permitting use of any special metal or alloy as desired, and such insert may be secured in position in a general axial passage whose end opening may be screw-threaded as at 19 and receive a connection pipe 20 which leads to the auxiliary control valve 6. A transverse opening 21 may similarly be screw-threaded and receive a connection for an alarm signal device or whistle base 22. The axial bore 15 has transverse bores 24, 25, and a passage 26 allows communication between the bores 24 and 25 as indicated in Fig. 2, but the transverse bore 25 and the end of the axial bore 27 are controlled by a valve in the form of a slide-valve 28 which is an extension from and carried by valve 10. That is, the two valves are on a common mounting and are operated in a predetermined relation to each other. The bore portion 15 is of larger diameter than the valve 28 and such spaced relation provides a steam passageway through which steam may flow from the steam space of the boiler or element 2 when the valve 10 is drawn back or opened by an appropriate drop of the liquid-level control lever 4. The bore portion beyond the point 24 and to the end 27 is of smaller diameter and fits the valve 28 so that the transverse bore or port 25 is normally closed when the valve 10 is also on its seat, but it will be observed that when the valve 10 is un-seated by a predetermined drop of the lever 4, steam may pass through the bore 15 and transverse bore 24 to the alarm whistle 22. The length of the valve 28 however is so proportioned that the port 25 and the opening through the end portion of the bore 27 is not uncovered until a further predetermined amount of drop has occurred in the water level in the boiler, actuating the lever 4, and then steam may proceed on through the passageways 26, 25, 27 to the connecting pipe 20 and the auxiliary valve 6, and shut off the fuel for instance to the furnace. A transverse opening 30 is provided with a filler element 31, which is on the general lines of construction as the valve 28, but is normally stationary. In installations carrying rather high steam pressure, there is a tendency for some slight leakage to occur around the valve 28 through the bore 27 and such may in time be of sufficient magnitude to allow undesirably high pressure on the control valve 6 and hinder normal operation of the fluid supply through the line 7. With the filler element 31 analogously related to the valve 28 in bore 27, any leakage at 27 will similarly occur at point 31, and with the provision of a vent 32 which may lead angularly outside, such steam escaping past the valve 28 is harmlessly vented to the atmosphere without interfering with the valve 6. The amount of steam however which would be supplied by the opening of the valve 28 could not so escape past the filler 31 but would exert its pressure through the connection 20 upon the valve 6 for operation thereof as contemplated in the safety-operation of the complete apparatus. Advantageously, the filler element 31 may be carried by a screw-threaded plug 33 provided with a wrench hold or screwdriver receiving slot 34 to permit removal for inspection or cleaning when desired. If the bores 15, 24, 25, etc. be contained in a support element in common, as a screw-threaded plug or valve body 35 carrying also the bracket 14 for support of the lever 4, a particularly convenient and advantageous arrangement may be had.

As already understood from the foregoing, the apparatus being applied on a steam boiler, and the water level therein being such that the lever 4 is held in its upmost or horizontal position, the valves 10 and 28 are both closed. If the water level drops such that the lever arm 4 is lowered to a position such as is indicated by dotted line B, the valve 10 is pulley away from its seat, but the valve 28 still closes off the transverse port 25 and the axial port 27. Steam can pass through bore 15 and bore 24 to the whistle 22 and sound an alarm, but it is blocked from the pipe 20 and auxiliary valve 6. An attendant, hearing the alarm, may now have opportunity to come and give attention to his feed water pump or the like, and with proper attention a normal condition may soon be restored and the boiler operation be continued. If however, the needed attention is not given, the water level continues to lower, and in a predetermined sequence, the lever 4 falling to the condition illustrated at C pulls the valve 28 out to uncover the ports 25 and 27, and steam flows further through the ports 25 and 27 to the connection 20 and operates the valve 6 for instance to shut off the fuel to the furnace and thereby avert disaster in the boiler. The compensating insert element 31 takes care of any minor leakage which may develop in the valve 28, and any interference normally with the valve 6 is prevented, since minor leaking steam simply vents to the atmosphere through passage 32.

In some instances, such as where boiler pressures are of a relatively low order, compensating means for leakage is not desired or necessary, and the construction may be along the lines as shown in Fig. 3, in which the valves 10' and 28' are in similar relations in regard to valve seats 16' and bores 15', 24', 25', 27', etc., and the axial passage proceeds to the connection pipe of the auxiliary valve 6 without intervention of any transverse opening or leak compensator, and the relationships otherwise are the same, as readily seen.

Other modes of applying the principle of the invention may be employed, change being made as regards the details described, provided the features stated in any of the following claims, or the equivalent of such, be employed.

I therefore particularly point out and distinctly claim as my invention:

1. In apparatus of the character described, a valve body, an axial passage therethrough and transverse openings from said passage, connectible to devices such as alarm means and boiler control means respectively, an insert in said passage, an axial bore through said insert in communication with the axial passage, a plurality of transverse bores through said axial bore in communication with one of said transverse openings, a valve seat about said axial bore in one end of said insert, a valve stem and liquid level controlled means for operating the same, a valve on said valve stem to cooperate with said valve seat, another valve carried by said stem and extending on from said first-named valve into said axial bore and being spaced from the wall thereof to the first transverse bore encountered and thence fitting as a slide valve controlling the next transverse bore and the end of the axial bore, a filler element in one of said transverse openings beyond the end of said insert-bore, a vent leading angularly from said opening, and a screw-threaded support for said filler.

2. In apparatus of the character described, a valve body, an axial passage therethrough and transverse openings from said passage, connectible to devices such as alarm means and boiler control means respectively, an insert in said passage, an axial bore through said insert in communication with the axial passage, a plurality of transverse bores through said axial bore in communication with one of said transverse openings, a valve seat about said axial bore in one end of said insert, a valve stem and liquid level controlled means for operating the same, a valve on said valve stem to cooperate with said valve seat, another valve carried by said stem and extending on from said first-named valve into said axial bore and being spaced from the wall thereof to the first transverse bore encountered and thence fitting as a slide valve controlling the next transverse bore and the end of the axial bore, a filler element in one of said transverse openings beyond the end of said insert-bore, and a vent leading from said opening.

3. In apparatus of the character described, a valve body, an axial passage therethrough and transverse openings from said passage, connectible to devices such as alarm means and boiler control means respectively, an insert in said passage, an axial bore through said insert in communication with the axial passage, a plurality of transverse bores through said axial bore in communication with one of said transverse openings, a valve seat about said axial bore in one end of said insert, a valve stem and liquid level controlled means for operating the same, a valve on said valve stem to cooperate with said valve seat, and another valve carried by said stem and extending on from said first-named valve into said axial bore and being spaced from the wall thereof to the first transverse bore encountered and thence fitting as a slide valve to control the next transverse bore and the end of the axial bore.

4. In apparatus of the character described, a body having an axial passage and transverse openings from said passage, connectible to devices such as alarm means and boiler control means respectively, an insert in said passage, an axial bore through said insert in communication with the axial passage, a plurality of transverse bores through said axial bore in communication with one of said transverse openings, a valve seat about said axial bore in one end of said insert, a valve stem and liquid level controlled means for operating the same, a valve on said valve stem to cooperate with said valve seat, another valve carried by said stem and extending on from said first-named valve into said axial bore and being spaced from the wall thereof to the first transverse bore encountered and thence fitting as a slide valve controlling the next transverse bore and the end of the axial bore, a filler element in one of said transverse openings beyond the end of said insert-bore, a vent leading from said opening, and a screw-threaded support for said filler.

5. In apparatus of the character described, a body having an axial passage and transverse openings from said passage, connectible to devices such as alarm means and boiler control means respectively, an insert in said passage, an axial bore through said insert in communication with the axial passage, a plurality of transverse bores through said axial bore in communication with one of said transverse openings, a valve seat about said axial bore in one end of said insert, a valve stem and liquid level controlled means for operating the same, a valve on said valve stem to cooperate with said valve seat, and another valve carried by said stem and extending on from said first-named valve into said axial bore and being spaced from the wall thereof to the first transverse bore encountered and thence fitting as a slide valve to control the next transverse bore and the end of the axial bore, and a leak-compensator beyond said axial bore.

6. In apparatus of the character described, a body having an axial bore and transverse bores through said axial bore, a valve seat at one end of said axial bore, a valve stem and liquid level controlled means for operating the same, a valve on said valve stem to cooperate with said valve seat, another valve carried by said stem and extending on from said first-named valve into said axial bore and being spaced from the wall thereof to the first transverse bore encountered and thence fitting as a slide valve to control the next transverse bore, and a leak-compensation beyond the end of the axial bore.

7. In apparatus of the character described, a body having an axial bore and transverse bores through said axial bore, a valve seat at one end of said axial bore, a valve stem and liquid level controlled means for operating the same, a valve on said valve stem to cooperate with said valve seat, and another valve carried by said stem and extending on from said first-named valve into said axial bore and being spaced from the wall thereof to the first transverse bore encountered and thence controlling the next transverse bore and the end of the axial bore.

JOHN ROWLAND BROWN.